March 5, 1963
W. R. MOBLEY
3,080,057
BELOW ATMOSPHERIC PRESSURE METHOD AND MEANS FOR SEPARATING
LIGHTER LIQUIDS FROM HEAVIER LIQUIDS
Filed March 13, 1959
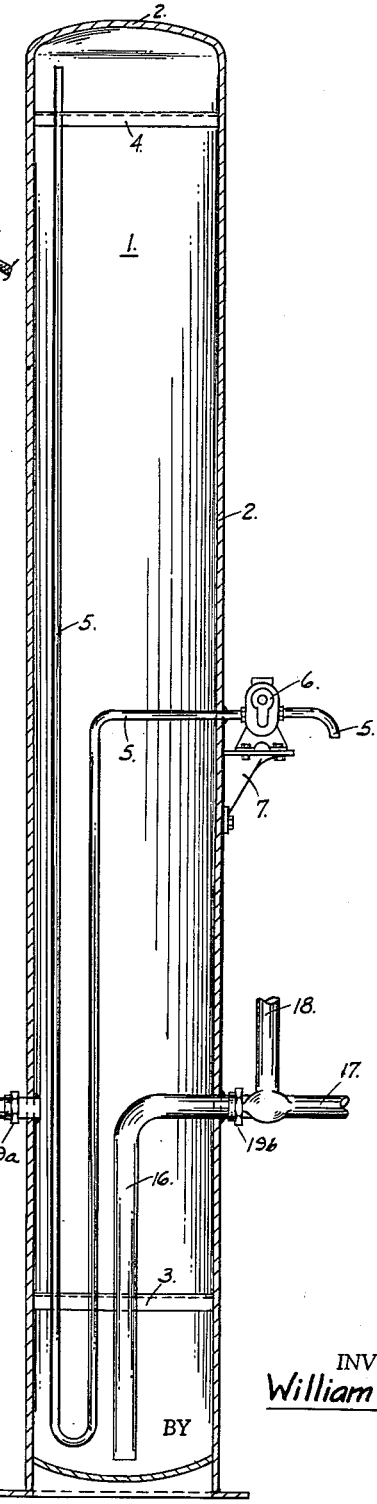
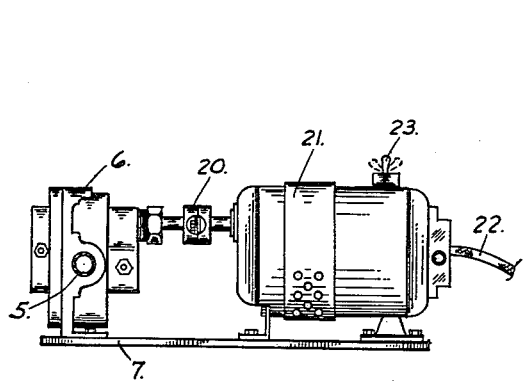
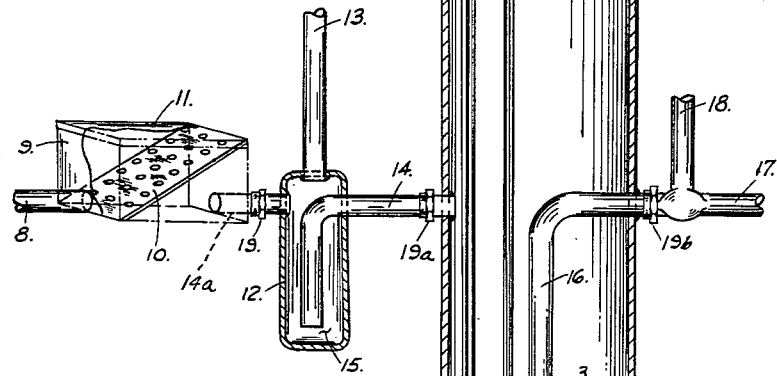
INVENTOR.
William R. Mobley.
BY

United States Patent Office 3,080,057
Patented Mar. 5, 1963

3,080,057
BELOW ATMOSPHERIC PRESSURE METHOD AND MEANS FOR SEPARATING LIGHTER LIQUIDS FROM HEAVIER LIQUIDS
William R. Mobley, Dade County, Fla.
(P.O. Box 2311, Miami 14, Fla.)
Filed Mar. 13, 1959, Ser. No. 799,367
5 Claims. (Cl. 210—83)

This invention relates to the separation of immiscible liquids of different specific gravities, but more particularly to separation of liquids by a system providing a vertically extended liquid column, to which liquid mixtures to be separated and from which separated heavy liquids are respectively admitted and discharged at the bottom region, with the region above the heavy liquid discharge point being subjected to a pressure below atmospheric.

The primary object of this invention is to eliminate the complicated method of opening and closing valves and the undesirable feature of closing down the system in order to remove the accumulated lighter liquids after separation, which have attended systems of this general character in the prior art.

Another object of the invention is to provide a simple method for the initial priming of a separator unit and for the removal of the accumulated air or gases from the system without valves. This feature makes it possible to remove the air or gases for the initial priming and to evacuate the lighter separated liquids by the simple method of starting and stopping a motor driven pump.

An additional object of the invention is to provide a structure whereby the solids such as sand, gravel and other heavier solids will continuously evacuate with the heavy liquid and will not accumulate to clog the system.

A still further object of the unit is to provide a simple method of cleaning without closing down the operation of the unit.

Another object of the invention is to screen out solid materials which are too large to be processed by the system.

Another object of the invention is to provide a structure whereby the liquid flows from near the bottom of the separating chamber at a high velocity evacuating the solids as a mixture. In the event that the solid materials should slow down the velocity, the head of the liquid in the inlet opening would rise immediately and the increased pressure would evacuate the solid materials. The conventional flow controls is thereby eliminated.

Another object of the invention is to provide a cleanout chamber with a removable cover for the solid materials too large to be processed by the system, the bottom of which is above the static level of the unit, so that the cleanout chamber is free of liquid when no liquid is fed to the system, thereby to simplify the removal of the solid materials.

Another object of the invention is to provide a below atmospheric pressure separating chamber that may be fabricated, tested, and shipped as a complete unit with the inlet opening for the liquid or liquid mixture and the trapped discharge lines for the lighter and heavier liquids fabricated inside the separating chamber.

Other additional objects, benefits, and advantages of the disclosed method and means will become evident from a study of the following detailed description taken in conjunction with the accompanying drawing, in which:

FIGURE 1 is a substantially central vertical section through the main parts of the assembled invention, showing the arrangements of the various parts and their relations to each other.

FIGURE 2 is an elevational view showing the pump and motor assembled on the base with reversible switch and power lines.

FIGURE 3 is a perspective view partly in section showing the cleanout chamber and the screen for the larger solid materials with the air separator and vortex preventing chamber combined as a single unit which preferably is substituted for the separate units shown in FIGURE 1.

Referring to the drawing and particularly to FIGURE 1, it will be observed that I have disclosed an inlet line 8 which leads from the supply source (not shown) into the cleanout chamber 9. Within the cleanout chamber 9, I have disclosed a screen 10 and a line 14a leading from behind the screen from the cleanout chamber 9 into the vortex preventing chamber 12. Leading from the top of the air separating and vortex preventing chamber 12, I have disclosed an air vent 13 which may be extended upward to any desired elevation. Leading from the bottom of the vortex preventing chamber 12 I have disclosed a trapped discharge line 14 leading into the interior of the separating chamber 1. It will be observed in FIGURE 3 that the line and coupling 19 shown in FIGURE 1 are eliminated and the vortex preventing chamber 12 is connected to the bottom of the cleanout chamber 9 and the trapped discharge line 14 is connected to the inlet line leading into the separating chamber 1 by union 19a. It will be observed that I have disclosed a trapped discharge line 16 leading from near the bottom of the separating chamber 1 and connected to the disposal system line 17 by the union 19b. The line 17 is provided with an air vent 18 which may be extended to any desired elevation. Leading from near the top of the said separating chamber 1, I have disclosed a light liquid discharge line 5. The said line 5 forms a trap at the bottom of the chamber 1 and extends upward and passes through the wall of chamber 1 in air tight relation. Connected to the trapped light liquid discharge line 5, I have disclosed a pump 6 mounted on a base 7 which is attached to the outside walls of the chamber 1 as shown. The pump assembly is disclosed in FIGURE 2 which consists of a motor 21 connected to a power line 22 with a reversible switch 23. The pump 6 and the motor 21 are mounted on a base 7 as shown and connected together by the coupling shown at 20. It will be observed that the light liquid discharge line 5 and the heavy liquid discharge line 16 are attached to the support 3 in the bottom of the chamber 1 and the discharge line 5 is attached to the support 4 at the top of the said chamber 1. The supports 3 and 4 are attached to the inside walls of the chamber 1 at opposite sides.

Having disclosed and described the invention in detail, I will now describe the method of initial priming and the continuous or intermittent operation including the evacuation of the separated liquid. It is obvious that the unit could be installed at ground level or at a higher or lower elevation in order that the liquid mixture would flow into the system from a higher elevation and the heavy liquid would discharge into the disposal system at an elevation below the static level of the system.

The installation and operation of the device is simple. The inlet line 8 leading into the system is connected to the supply source of the liquid mixture (not shown), the outlet line 17 is connected to the disposal system (not shown), water is now admitted to the system and enters the cleanout chamber 9 from the line 8 passing through the holes in the screen 10 filling the interior of the chamber 15 to the static level. The liquid then passes from near the bottom of the chamber 15 through the line 14 into the bottom of the separating chamber 1. When the liquid rises in the chamber 1 and the discharge line 16 equal to the static level, the liquid flows from the bottom of the separating chamber through the lines 16 and 17 into the disposal system. It will be observed that the motor and pump is connected to the trapped discharge line 5 for the lighter liquids. The arrangement of the pump shown in FIGURE 1 is shown in detail in FIGURE 2. The reversible switch 23 is at the center in off position. The switch is now thrown to the right to start the motor and pump. The air is evacuated from the separating chamber forming a pressure below atmosphere, causing the liquid to rise (by the action of the external atmospheric pressure) in the separating chamber 1 to the top of the discharge line 5 and when the liquid discharges freely from the pump, the switch 23 is thrown in the off position to stop the motor. The below atmospheric pressure chamber 1 is thus primed with liquid and the unit is ready for operation. During the priming operation, it is imperative that a sufficient amount of liquid be admitted to the system to replace the liquid that displaces the air and liquid evacuated by the pump. The chamber 15 must be completely filled at all times during priming or drawing of the separated light liquid. Any liquid admitted to the system during this operation over and above this amount will flow into the disposal system.

The system is now ready for continuous or intermittent operation. The body of liquid above the static level is retained in a below atmospheric pressure zone which reduces the time lag necessary to separate the lighter impurities from any liquid which may be admitted to the system.

Now if liquid which contains emulsions or other lighter impurities is admitted to the system the lighter impurities in the liquid mixture will separate and accumulate at the top of the below atmospheric pressure zone where they are retained in the process of separation as the heavier impurities continue to separate from the accumulated lighter liquid separated from the heavier liquid. The heavier liquids and the heavier impurities displaced from the below atmospheric pressure zone along with the heavier solids contained in the mixture are evacuated from the bottom of the separating chamber to the disposal system. The unit is designed to prevent the undesirable feature of entraining air with the liquid. The air entrained with the liquid entering the vortex arresting chamber is separated and passes to the atmosphere through the vent 13. Referring to the vortex arresting chamber and air separator 12 and 13, it will be observed that the trapped line 14 leading from near the bottom of the vortex arresting chamber as shown at 15 is in a substantially vertical position. This feature prevents such an air vortex from forming and entering the line 14 at the bottom. When the liquid discharges through an outlet extending downward or horizontally, it tends to cause a vortex to form and air to enter the center of the stream of liquid and entrain with the liquid. The liquid flowing upward in the vertical discharge line 14 prevents the formation of such a vortex since the position of the discharge line at the surface of the liquid is at the point where the vortex would form. In some cases it does form and resolves around the discharge line but does not pass or entrain with the liquid being discharged. Therefore, air is separated but does not entrain with the liquid or liquid mixture entering the below atmospheric pressure separating zone.

However, there is free air or oxygen in the liquid under atmospheric pressure which is separated by the action of the below atmospheric pressure and accumulates at the top of the said zone. This accumulated air or gases may be removed by throwing the switch to the right to start the motor and pump. The liquid in the trapped discharged line will be discharged first and the accumulated air separated from the liquid will be discharged, after which the accumulated lighter liquid will be discharged and when the heavy liquid appears, the switch is thrown to neutral. During this operation it is imperative that a volume of liquid be admitted equal to or greater than the volume of liquid displaced by the air and liquid removed by the pump.

As the unit is designed to evacuate the heavy solids with the heavy liquid discharged and the solids too large to be processed by the unit are arrested by the non-removable screen the unit should operate trouble free.

However, should it be necessary to clean the unit, the air and light liquids are evacuated by the pump until the water discharges from the pump. The pump is now operated in reverse by throwing the switch to the left and all the liquid in the below atmospheric zone will be released through the discharge line at the bottom of the separating chamber at a high velocity. This will cause the evacuation of all the accumulated solids including sand or gravel. The liquid in the separating chamber below the static level would be retained and it would not be necessary to close down the system during the cleaning operation. The switch is now thrown to the right to evacuate the air and reprime the separator from the stream of liquid flowing through the system as has previously been described.

In FIGURES 1 and 2, I have shown a gear pump 6 for the reason that it will evacuate the air and is designed to pump lighter liquids such as grease and oil. Any suitable pump may be substituted.

This makes it possible to produce the complete unit in three parts which may be installed at the proper elevation and connected together in a simple manner, after which it would be simply a matter of connecting the inlet and outlet lines to the unit. This would eliminate errors in the installation.

While this invention has been described with particular reference to the construction shown in the drawing, it is to be understood that the construction is subject to change and modification within the spirit and scope of the present invention as defined by the appended claims.

Having completely and fully described the invention that which is now claimed as new and desired to be protected by Letters Patent of the United States is:

1. A below atmospheric pressure separator consisting of a supply line for a liquid or liquid mixture leading into a cleanout chamber with a removable cover, a sealed separating chamber, a vortex arresting chamber communicating at the top with the bottom region of the cleanout chamber, a screen in the said cleanout chamber to intercept the larger solid materials, a discharge line leading from the bottom of the vortex arresting chamber and discharging within the sealed separating chamber, air vent means communicating with the top of the said vortex arresting chamber, a heavy liquid discharge line leading from the bottom of the sealed separating chamber and elevated to a point determining the static level of liquid in the vortex arresting chamber and having an air vent, a light liquid discharge line leading from near the top of the sealed separating chamber to a region near the bottom of the said separating chamber and thence extending upward and then through a wall of the sealed separating chamber thereby forming a trap, a motor powered reversible pump connected to the light liquid discharge line operable in one direction for evacuating the air and lighter liquids from the sealed separating chamber to form a body of liquid in a below atmospheric zone of separation from a constant stream of admitted liquid and operable in the other direction to pump air to the sealed chamber to discharge the heavy liquid at high velocity in cleaning the sealed separating chamber of accumulated solids.

2. A below atmospheric pressure separator for the separating of lighter and heavier liquids, comprising an inlet line to a vortex arresting air separating chamber, a sealed separating chamber, a trapped discharge line leading from near the bottom of the vortex arresting chamber and discharging within the interior of the sealed separating chamber, an air vent line leading upwardly from the top of the vortex arresting chamber, a trapped heavy liquid discharge line leading from near the bottom of the sealed separating chamber through a wall of the said sealed separating chamber and discharging at an equal elevation to the vortex arresting chamber to maintain a static level, an air vent extending upward from the heavy liquid discharge line, a light liquid discharge line leading downward from the top of the sealed separating chamber forming a trap at the bottom and extending upward through a wall of the said sealed separating chamber, a motor driven reversible pump connected to the light liquid discharge line, supports attached respectively at the top and bottom of the interior of the sealed separating chamber for supporting the lighter and heavier liquid discharge lines at the bottom and the lighter discharge line at the top and reversing control means for the said motor.

3. A process for separating a mixture of low and high specific gravity liquids which includes passing an influent stream of the mixture through a zone at atmospheric pressure to vent gas from the stream while arresting air entraining vortex formations in the flowing mixture, partially establishing a vertically extending column of the mixture and then extending the height of the established column by lowering the pressure upon the top of the column whereby the rise of the low gravity liquids above the high gravity liquids is facilitated, adding the mixture to the lower regions of the column, drawing off the accumulating light gravity liquids from the top low pressure region of the top of the column downwardly to the bottom region of the column and then upwardly to a mid-region of the column and there effecting discharge of the accumulated light liquid from the column and increasing the pressure on the top of the column after the light gravity liquids have been removed from the column by applying air pressure upon the remaining part of the column thereby to effect discharge of the heavy liquid from the column at the horizontal level of the ingress of the mixture to the column.

4. A liquid mixture separator comprising, a vertically extending tank with the top region thereof hermetically sealed, an influent line, an effluent line, said lines being located a substantial distance above the bottom of the tank, said influent line being provided with an inverted L-shaped trap formation having a vertical trap leg forming a part of a vortex arresting means vented to the atmosphere, the effluent line being also provided with an inverted L-shaped trap formation with a leg of the last said trap formation extending to the bottom of the tank, a suction and pressure line having an open end in the top interior region of the tank and extending downwardly substantially the height of the tank and bent upwardly to form a trap, the upwardly bent portion extending to at least the height of the influent line and extending transversely through the wall of the tank, and a reversable pump attached to an exterior portion of the suction and pressure line.

5. Apparatus for separating lighter and heavier liquids from a liquid mixture comprising: a sealed vertically elongated separating chamber, an inlet line having a trap formation opening into the separating chamber, a discharge line leading upward from near the bottom of the separating chamber through a wall of the said chamber in air tight relation and discharging at substantially the same level as that at which the inlet line opens into the tank, a light liquid discharge line leading downward from near the top of the sealed separating chamber to near the bottom of the said chamber and returning upward and passing through a wall of the said sealed separating chamber in air tight relation, a motor driven reversible pump connected to the said light liquid discharge line operable in one direction to evacuate the air and form a liquid body in the separating chamber to provide a below atmospheric pressure zone and to evacuate the accumulated light liquids and operable in the other direction to pump air into the chamber for accelerated expulsion of liquid through the discharge line.

References Cited in the file of this patent

UNITED STATES PATENTS

| Number | Name | Date |
|---|---|---|
| 266,204 | Roeckner | Oct. 17, 1882 |
| 463,120 | Dennes | Nov. 10, 1891 |
| 860,930 | Merten | July 23, 1907 |
| 1,045,811 | Buhring | Dec. 3, 1912 |
| 1,052,391 | Valerius et al. | Feb. 4, 1913 |
| 1,079,398 | Coakley et al. | Nov. 25, 1913 |
| 2,747,736 | Mobley | May 29, 1956 |